United States Patent [19]

Kunde

[11] Patent Number: 4,612,941
[45] Date of Patent: Sep. 23, 1986

[54] COMBINE HARVESTER STRAW CHOPPER STATIONARY KNIFE ADJUSTMENT

[75] Inventor: Detlev Kunde, Homburg, Fed. Rep. of Germany

[73] Assignee: Deere & Company, Moline, Ill.

[21] Appl. No.: 755,409

[22] Filed: Jul. 15, 1985

[30] Foreign Application Priority Data

Jul. 19, 1984 [EP] European Pat. Off. ........ 84108528.5

[51] Int. Cl.⁴ ...................... A01D 41/12; A01D 89/00
[52] U.S. Cl. .................................. 130/27 R; 56/14.6; 56/12.7; 241/241
[58] Field of Search ............ 130/27 R; 56/14.6, 12.7, 56/504, 505; 241/241, 238, 190

[56] References Cited

U.S. PATENT DOCUMENTS

| | | | |
|---|---|---|---|
| 1,440,429 | 1/1923 | Williams | 241/190 |
| 1,529,760 | 3/1925 | Yerk | 241/238 |
| 2,842,175 | 7/1958 | Thompson | 130/27 R |
| 2,892,478 | 6/1959 | Gronberg | 241/190 |
| 3,380,502 | 4/1968 | Gronberg | 130/27 R |

FOREIGN PATENT DOCUMENTS 2815936 10/1976 Fed. Rep. of Germany .... 130/27 R

Primary Examiner—Gene Mancene
Assistant Examiner—John G. Weiss

[57] ABSTRACT

In the straw chopper of a combine harvester, an array of stationary knives may be adjusted generally radially into greater or lesser intermeshing engagement with blades of the chopper rotor. Guide and mounting means ensure that the relative angularity between the stationary knives and the chopper rotor remains constant at all adjustment positions of the stationary knives. The knives are fixed to a transverse carrier and a pair of opposite releasable adjustment levers extend downwards to be rigidly joined by a transverse handle, conveniently accessible and beneath and somewhat forward of the straw chopper casing. The stationary knife mounting arrangement facilitates adjusting the knives in unison and maintaining the knife array parallel to the axis of the straw chopper rotor.

9 Claims, 5 Drawing Figures

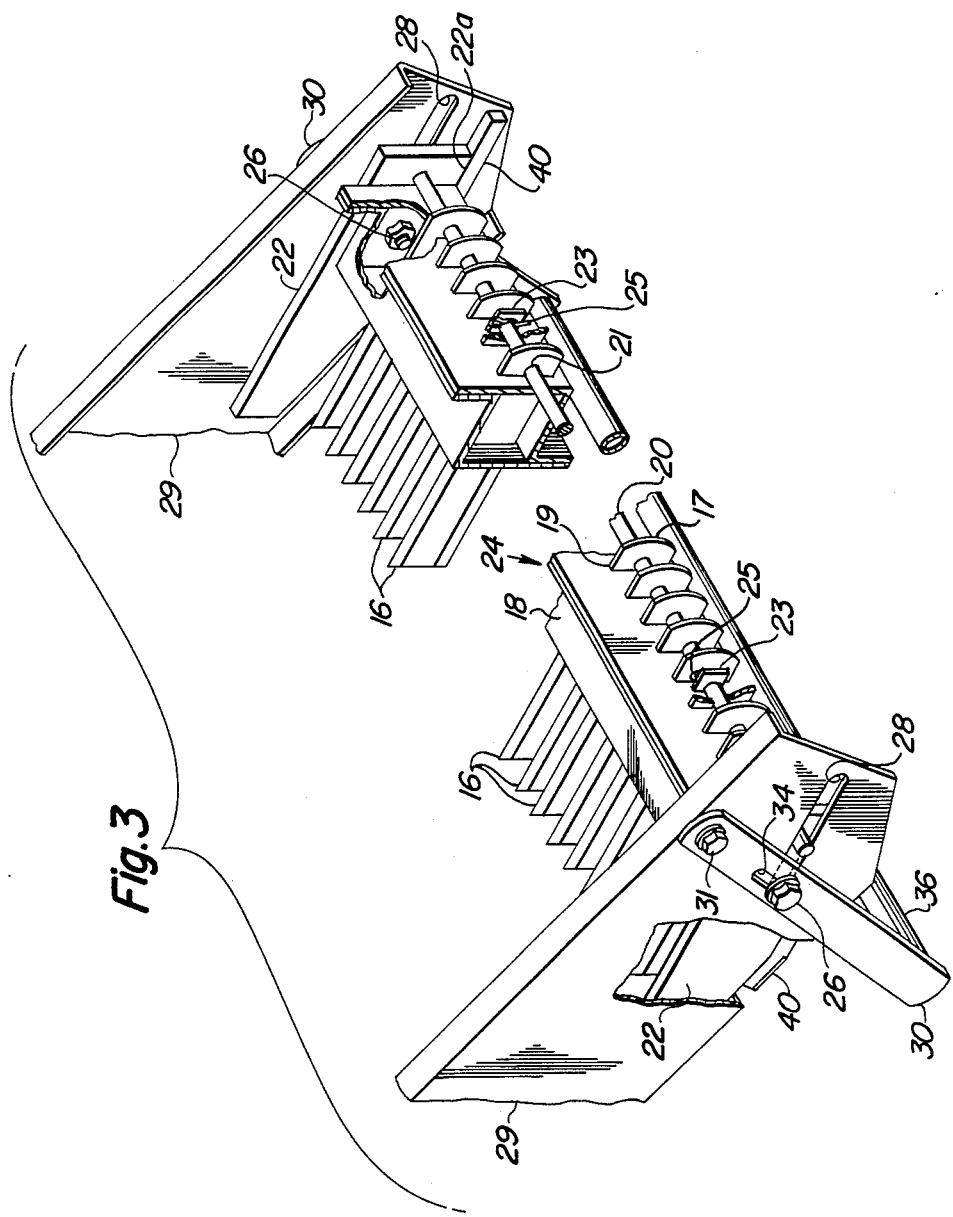

COMBINE HARVESTER STRAW CHOPPER STATIONARY KNIFE ADJUSTMENT

BACKGROUND OF THE INVENTION

This invention concerns a straw chopper of the type attached to a combine harvester and used for chopping and distributing over the ground, straw received from the straw walkers of the combine and, more particularly, a means for supporting and adjusting a stationary knife portion of such a straw chopper.

It is common practice to provide a bank of stationary knives to interact with the blades of a straw chopper rotor so as to improve the effectiveness of the chopper in comminuting the material fed to it. The stationary knives are disposed and spaced so that the outer portions of blades of the chopper rotor pass between the stationary knives with somewhat of a shearing effect. Typically, the stationary elements (knives) are made adjustable in terms of their degree of engagement with the rotor so as to selectively vary the chopping effect, according, for example, to crop type and condition.

In most stationary knife adjustment systems, the knife support is pivoted to the straw chopper housing or combine frame adjacent the housing on a simple single pivot disposed relatively close to the stationary knives so that the knives can be swung towards or away from the straw chopper rotor and locked by suitable clamping means in a selected position. Structurally, this is a simple arrangement but results in wide variations in relative angularity between the stationary knife and rotor blade during the working phase when the blade passes between the stationary knives. For good function, there is an optimum relative angularity between the stationary and moving knives or blades and obviously, with a simple pivoting adjusting of stationary knife, this optimum can be achieved at only one knife setting.

It is known in a pivotably adjustable stationary knife support of the type just described, to provide for the individual stationary knife elements to be advanced or retracted generally towards or away from the rotor axis by carrying the stationary knives in slots or slits in a stationary knife carrier and providing a number of positioning holes in each knife and retaining means for holding them in any one of a series of preselected positions. Even when a common retaining means such as a single rod extending through the holes in the knife sections is used, changing setting or adjustment is inconvenient in that each stationary knife portion must be individually and properly positioned before the retaining rod can be inserted to establish the new adjustment position of the stationary knife sections.

Another disadvantage of known stationary knife adjustment systems is that, especially in their fully retracted position, components of the system may intrude into the space generally rearwardly and upwardly of the discharge ends of the cleaning shoe chaffer and sieve and impede access for adjustment and/or removal and installation of chaffer and sieve screens.

SUMMARY OF THE INVENTION

Accordingly, it is an object of the invention to provide a stationary knife adjustment for a straw chopper which retains much of the relative simplicity of known methods but provides, more conveniently and reliably, a means for selectively adjusting the effective engagement of stationary knives with the chopper rotor while maintaining a predetermined optimum effective relative angularity between the stationary knife sections and the blades of the rotor (effective that is with respect to each rotor blade when in the interacting phase as the blade approaches and passes between corresponding stationary knives).

The object of the invention may be realized, at least in part, by providing a plurality of guide surfaces for the stationary knives, the guide surfaces lying in or parallel to a common plane so that movement of the stationary knives along or with respect to the guide surfaces (fixed with respect to the rotor) do not result in any change of effective angularity between the stationary knives and blades of the rotor. Preferably, the stationary knife sections are connected together so that they may be moved easily, in unison, during the course of adjustment. A suitable clamping means may be provided to hold the stationary knife assembly in its preselected adjustment position.

In a preferred embodiment, the stationary knife sections are carried in parallel array in a transversely extending carrier provided with a pair of elongated guide surfaces at its respective opposite ends, said guide surfaces engaging mating or corresponding guide surfaces fixed to the chopper housing or combine frame. Preferably, additional guide means parallel to the first guide surfaces are provided to hold the carrier against the fixed guide surfaces during adjustment. Preferably, the moving of the opposite ends of the stationary knife assembly, and particularly its carrier, in unison and maintaining the knife assembly parallel to the rotor axis is assisted by a pair of parallel adjustment levers, one engaging each opposite end of the stationary knife carrier and coaxially pivoted to the combine frame or chopper housing at a pivot axis spaced from the guide surfaces in a first direction (such as above the guide surfaces) and each lever extending beyond the guide surfaces in a second direction (such as below the guide surfaces) and being connected at their free extremities by a transversely extending handle (tubular, for example) parallel to the rotor axis. Preferably, each end of the handle is rigidly attached to its adjustment lever and the handle provides not only a convenient means for manually adjusting the stationary knife assembly but also a convenient sight gage for maintaining the alignment of the assembly.

In an alternative embodiment, the stationary knife carrier may be fixed relative to the combine frame or chopper housing with individual knives carried slidably in slots in the carrier, the slots providing guide surfaces which maintain the relative angularity of the knives as they are slidably adjusted towards or away from the rotor axis. Rearward extensions of the knife sections may be linked together, for example with a transverse rod passing through holes in the knives which may be connected at its opposite ends to a swinging lever handle arrangement as described above.

BRIEF DESCRIPTION OF THE DRAWINGS

FIG. 3 is a right, front three-quarter perspective view taken somewhat from above, of the straw chopper stationary knife arrangement removed from the combine.

DESCRIPTION OF THE PREFERRED EMBODIMENTS

Figure 1:
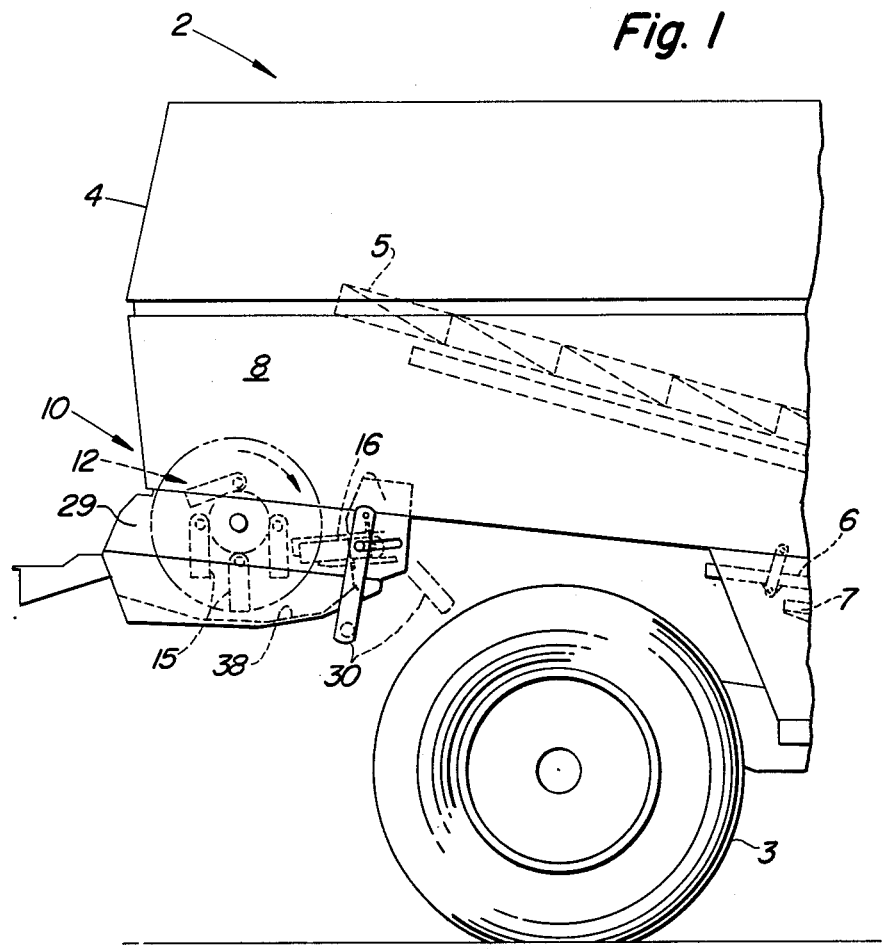
FIG. 1 is a semi-schematic right-hand side elevation of a rear portion of a combine harvester embodying the invention.

The invention is embodied in an otherwise generally conventional, self-propelled combine harvester, a rearward portion of which is shown in FIG. 1. The combine body 2 is supported above the ground on a pair of forward wheels not shown and rear wheels 3 and includes a hood 4 opening downwards and generally covering conventional straw walkers 5 and a cleaning shoe including an upper chaffer screen 6 and a lower sieve screen 7. Opposite hood sidewalls 8 support, towards their lower rearward ends, the opposite ends of a straw chopper assembly 10.

Figure 2:
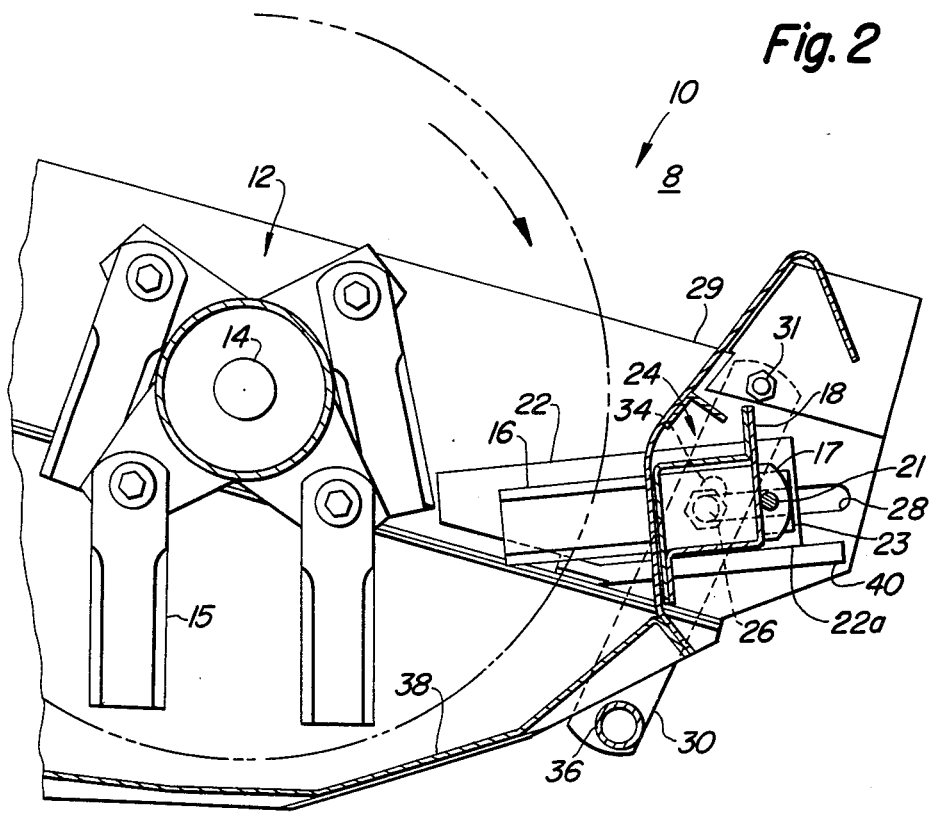
FIG. 2 is an enlarged partial cross-sectional view taken on a fore-and-aft vertical plane intermediate between the ends of the straw chopper of the combine and showing the chopper rotor and stationary knife arrangement.

The straw chopper, seen in more detail in FIGS. 2 and 3, includes a generally conventional swinging blade rotor 12 (carried on a shaft 14) which receives material delivered downwardly from the straw walker 5. Intermeshing with the blades 15 of the rotor is a transversely extending array of stationary or counterknives 16. The knives are carried in a transverse support member or carrier 18 of hollow rectangular cross section, extending through the support in vertical slots 19. The forward end 17 of each stationary knife 16 includes a positioning or retaining hole 21 and the stationary knives are retained and positioned by a rod 20 passing through the holes 21 and a pair of spaced-apart lugs 23 extending forwardly from the forward wall of the support member 18. The rod 20 is secured against axial movement relative to the lugs 23 by a pair of hair pin cotters 25 passing through the rod adjacent the lugs 23.

The opposite ends of the support member 18 are closed by elongated, generally fore-and-aft extending guide plates or flanges 22 each having a lower guide edge 22a. The stationary knife support assembly 24 thus formed spans the space between the opposite hood sidewalls 8 and each end abuts a reinforcing or mounting plate 29 of the chopper, carried by the hood sidewalls 8. The stationary knife support assembly (24) is positioned at each end by a guide pin in the form of a threaded fastener 26 threaded into the flange 22 and passing through an adjusting lever 30 and a generally fore-and-aft extending slot 28 in the sidewall plate 29. Each lever 30 is pivoted to the sidewall structure by suitable pivot hardware at 31. The axes of the pivots 31 are transversely aligned and their common axis is parallel to the axis (14) of the chopper rotor 12. A short axial slot 34 in the lever 30 provides for relative axial movement of the guide pin 26 whenever the lever is pivoted about its pivot axis 31. The free or lower ends of the opposite adjusting levers 30 are joined by a transversely extending tubular handle 36 attached rigidly, as by welding, at its opposite ends to the levers 30. Each sidewall plate 29 carries on its inner surface a generally fore-and-aft extending ledge-like guide rail 40 tipped upwards at its rearward end but generally parallel to the slot 28.

In operation, to adjust the position of the stationary knives 16, the pivot and clamping hardware, 31 and 26 respectively, are loosened and by manipulation of the handle 36, the levers 30 may be swung in unison in a vertical plane so that each guide pin 26, guided at least in part by slot 28, displaces the stationary knife support assembly 24, and hence the stationary knives 16, fore-and-aft as desired for a particular operating condition. The attitude or angularity of the stationary knives 16 relative to the rotor 12 is maintained in all positions of adjustment by the combined guiding and retaining effect of the pin 26 in the slots 28 and the engagement of the end plates or flanges 22 particularly their lower edges 22a with the guide rails 40. These guide members not only serve to support and control the stationary knife assembly 24 as it moves fore-and-aft but also prevents tipping or pivoting about the guide pins 26. The presence of the transverse handle 36 tying the opposite adjustment levers 30 together facilitates maintaining parallel alignment between the array of the stationary knives 16 and the axis (14) of the straw chopper rotor 12 during adjustment. Movement of all stationary knives 16 in unison is facilitated by this arrangement. The transverse alignment of handle 36 provides a convenient externally available visual guide to alignment of the stationary knife array which is normally hidden from view by the undercasing 38 of the straw chopper. After adjustment, the stationary knives are secured in their new position by tightening the clamping and pivoting hardware at 26 and 31 respectively.

The parallel inclinations of the slots 28 and guide surfaces 22a and 40 and the knife (16) disposition chosen and indicated in the drawings provides good chopper function in a wide range of harvesting conditions. The relatively simple mounting and convenient adjustment by handle 36 and lever 30 facilitates maintaining a preferred effective relative angularity between rotor blades 15 and stationary knives 16 over the full range of their adjustable radial engagement.

Figure 5:
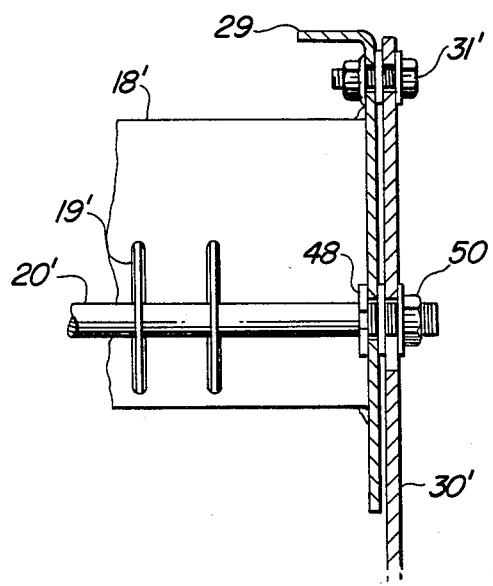
FIG. 5 is a partial cross-sectional view of the left-hand end of the alternative embodiment taken approximately on line 5—5 of FIG. 4.
Figure 4:
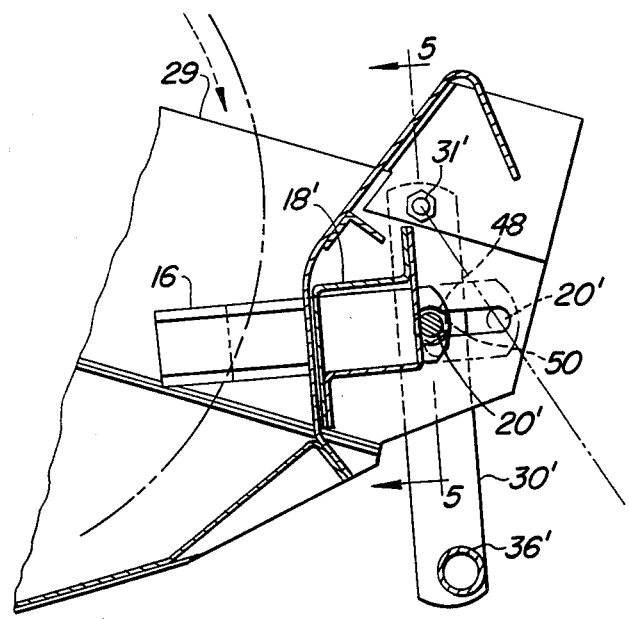
FIG. 4 is a partial view similar to FIG. 2 showing the stationary knife arrangement of an alternative embodiment of the invention.

In an alternative embodiment (FIGS. 4 and 5), the transverse support box 18' is rigidly attached at its opposite ends to the opposite side plates 29 while the individual stationary knives 16 are carried and guided in slots or slits 19' in the box 18' and controlled in unison by a rod 20' threaded through their forward ends. The opposite ends of the rod 20' are threaded and fitted with a snap ring 48 so that by means of tightening an external nut 50, the opposite levers 30', pivotable about pivot 31', may be clamped or locked in position against the side plates 29 thus setting the stationary knives 16 in a particular position. Adjustment is achieved by loosening the nuts 50 and manipulating the handle 36' as described above to adjust the knives in a range between a fully engaged and a retracted position as indicated in FIG. 4.

I claim:

1. In a combine harvester for harvesting grain crop material, having means for processing the material and dividing it into grain, straw and chaff fractions, and having a body and means for receiving, conveying and discharging the straw fraction, and a straw chopper having an inlet in a crop material receiving relationship with the discharged straw fraction, the straw chopper including a transverse rotor rotatable about a generally transverse axis and having generally radially extending spaced apart blades, and a transverse array of stationary elements extending generally radially towards the chopper rotor axis and disposable to radially overlap the blades of the rotor, an adjustment arrangement for selectively varying said radial overlap comprising:

a pair of transversely spaced linear first guide surfaces carried by the combine body, extending generally radially with respect to the chopper rotor axis;

a transversely extending carrier for supporting the stationary elements in transversely spaced array, extending substantially parallel to the rotor axis, the carrier including a pair of transversely opposite ends, each end including at least one generally longitudinally extending guide surface for mating with the guide surfaces of the combine body and an adjustment lever connecting means;

an adjustment lever including a pivot end pivotably attached to the combine body for pivoting about a fixed generally transverse pivot axis and an opposite handle end and an intermediate carrier engaging portion for engaging the adjustment lever connecting means of the carrier, the lever being swingable fore-and-aft in a generally upright plane for slidably adjusting the stationary knife carrier fore-and-aft, said slidle adjustment being defined and controlled by the mating guide surfaces; and clamping means effective between the carrier and the combine body operable to secure the knife carrier in a selected position.

2. The adjustment arrangement of claim 1 wherein each carrier opposite end includes a longitudinally elongated end plate having opposite upper and lower edges at least one of which edges constitutes a guide surface engageable with a guide surface of the combine body.

3. The adjustment arrangement of claim 2 and further including a combine body portion defining an elongated slot, said slot defining second guide surfaces parallel to the first guide surfaces and wherein the adjustment lever connecting means of the knife carrier includes means extending into the slot so that when the knife carrier is adjusted, the second guide surfaces cooperate with the first guide surfaces to control the slidable movement of the knife carrier.

4. The adjustment arrangement of claim 3 wherein the clamping means includes a threaded fastener engaging an end plate of the carrier and operable to clamp the adjustment lever against the combine body portion for holding the knife carrier in a selected adjustment position.

5. The adjustment arrangement of claim 2 wherein the combine body includes a structure portion having an elongated slot extending generally parallel to the guide surfaces and wherein the adjustment lever connecting means of the carrier engages said slot so that in adjustment, the overall direction of movement of the carrier is defined by the slot and rotation of the carrier and stationary elements relative to the combine frame is prevented by the guide surfaces of the combine frame structure engaging the guide surfaces of the carrier end plates.

6. The adjustment arrangement of claim 1 and further including a second adjustment lever pivotably coaxial with the first, for engaging and adjusting the opposite end of the knife carrier and an elongated handle substantially spanning the axial extent of the straw chopper rotor and rigidly attached at each of its opposite ends to the handle portion of the respective adjustment levers so that fore-and-aft manipulation of the handle swings the adjustment levers in unison so as to slidably adjust the knife carrier while maintaining the knife carrier parallel with the axis of the chopper rotor.

7. The adjustment arrangement of claim 1 wherein the carrier includes a body extending between the opposite ends of the chopper, said body being of generally tubular construction and including a plurality of through slots for receiving the stationary elements, one element in each slot, and disposed and dimensioned so that the slots are supported and aligned in parallel array and means for retaining the stationary elements in the carrier body.

8. The adjustment arrangement of claim 7 wherein each knife is elongated in a generally longitudinal direction and the knives extend generally parallel to the guide surfaces.

9. In a combine harvester for harvesting grain crop material, having means for processing the material and dividing it into grain, straw and chaff fractions, and having a body and means for receiving, conveying and discharging the straw fraction, and a straw chopper having an inlet in a crop material receiving relationship with the discharged straw fraction, the straw chopper including a transverse rotor with spaced apart generally radially extending blades, and a transverse array of stationary elements extending generally radially towards the chopper rotor axis and disposable to radially overlap the blades of the rotor, an adjustment arrangement for selectively varying said radial overlap comprising:

a stationary element carrier having a body and extending generally parallel to the axis of the chopper rotor and supported by the combine body;

a plurality of spaced-apart slots in the carrier body for receiving, one element in each slot, the stationary elements of the chopper and supporting them in parallel aligned spaced array, each stationary element having an outward end extending outwardly of the carrier body with respect to the rotor and including connecting means;

an elongated adjustment actuator rod extending parallel to the chopper rotor axis engageable with the connecting means of the stationary elements;

a pair of adjustment levers carried one at each opposite side of the combine body and supported for coaxial pivoting about a transverse pivot axis, each lever engaging an opposite end of the adjustment actuator rod and each lever having a handle portion extending beyond the connection with the adjusting rod, and further including a transversely extending handle, the respective handle portions of the levers being connected in rigid attachment to the transversely extending handle so that fore-and-aft manipulation of the transverse handle moves the adjustment levers in unison and hence the stationary knives in fore-and-aft adjustment, guided by the slots in the carrier body and maintained parallel to the axis of the rotor.

* * * * *